United States Patent [19]

Shinmoto

[11] Patent Number: 5,211,898
[45] Date of Patent: May 18, 1993

[54] METHOD AND APPARATUS FOR FEEDING A PLURALITY OF MOLTEN RESIN JET STREAMS INTO T DIE

[75] Inventor: Jitsumi Shinmoto, Tokyo, Japan

[73] Assignee: Tomy Machinery Manufacturing Co., Ltd., Tokyo, Japan

[21] Appl. No.: 706,568

[22] Filed: May 28, 1991

Related U.S. Application Data

[63] Continuation of Ser. No. 385,805, Jul. 26, 1989, abandoned.

Foreign Application Priority Data

Jul. 27, 1988 [JP] Japan .................. 63-187598

[51] Int. Cl.$^5$ .................................................. B29C 47/14
[52] U.S. Cl. ............................ 264/171; 264/40.7; 264/245; 425/131.1; 425/133.5; 425/197; 425/462
[58] Field of Search ............. 264/171, 245, 40.7; 425/131.1, 133.5, 462, 197

[56] References Cited

U.S. PATENT DOCUMENTS

| | | | |
|---|---|---|---|
| 3,743,460 | 7/1973 | Woolridge | 425/133.5 |
| 3,909,170 | 9/1975 | Riboulet | 425/133.5 |
| 4,426,344 | 1/1984 | Dinter et al. | 425/133.5 |
| 4,731,004 | 3/1988 | Wenz, Jr. | 425/133.5 |
| 4,889,669 | 12/1989 | Suzuki | 264/171 |

FOREIGN PATENT DOCUMENTS

| | | | |
|---|---|---|---|
| 2343582 | 11/1977 | France | 425/131.1 |
| 61-89823 | 5/1986 | Japan | 425/131.1 |
| 61-241121 | 10/1986 | Japan | 425/133.5 |
| 62-191120 | 8/1987 | Japan | 425/131.1 |
| 62-264925 | 11/1987 | Japan | 425/462 |
| 63-21123 | 1/1988 | Japan | 425/131.1 |

*Primary Examiner*—Jeffrey Thurlow

[57] ABSTRACT

The present invention feeds a plurality of different molten resin jet streams into a T die adapted to produce film members such as plastic films. A plurality of molten jet streams extruded from a plurality of extruders, respectively, are fed from their predetermined directions into one resin feed passage in communication with the T die and combined or united without causing the mixture with each other. The relative positional relationship between the intersurfaces between the adjacent molten resin jet streams defined when the molten resin jet streams are combined or united on the one hand and an elongated discharge port of the T die can be adjusted so that the relative positional relationship between a plurality of extruders and the T die can be freely changed.

33 Claims, 9 Drawing Sheets

METHOD AND APPARATUS FOR FEEDING A PLURALITY OF MOLTEN RESIN JET STREAMS INTO T DIE

This application is a continuation of application Ser. No. 385,805, filed Jul. 26, 1989 now abandoned.

FIELD OF THE INVENTION

The present invention relates to a method and an apparatus for feeding a plurality of molten resin jet streams into a T die adapted to form film members of films, sheet and the like each consisting of different resins or adapted to use to produce laminated sheets each consisting of a plurality of different resins.

BACKGROUND OF THE INVENTION

In general, in the case of the production of films or the like by using a T die, a thermoplastic resin fed from a hopper into an extruder is melted while being transported through an air-tight cylinder and the melted resin is extruded toward the T die. The molten resin is discharged through an elongated discharge port of the T die, whereby the desired films or the like are obtained.

The combinations of the extruders and the T dies are used to form cast films, sheets, laminated sheets and so on.

Of these plastic forming methods, as shown in FIGS. 1 and 2, the extrusion direction A of an extruder and a longitudinally extended discharge port 3 of a T die 2 are maintained mutually perpendicular. In the case of the production of laminated sheets, as shown in FIG. 3, the extrusion direction A of the extruder 1 is so determined as to be in parallel with the longitudinal direction of the discharge port 3 of the T die 2. The reasons why the relative position between the extruder 1 and the T die 2 is changed is as follows. In the case of the production of laminated sheets, film members to be laminated must be transported in the direction perpendicular to the discharge port 3 of the T die. When the extrusion direction A of the extruder 1 is maintained perpendicular to the discharge port 3 of the T die 2, the extruder interrupts the transportation of a film member to be laminated cannot be transported in the direction perpendicular to the discharge port 3 of the T die 2.

Each of the production methods described above can produce not only film members each consisting of a single layer and laminates each consisting of a single layer but also film members each consisting of a plurality of layers and laminates each consisting of also a plurality of layers. When the plastic products each consisting of a plurality of layers, not only the quality of the produced film members and the like can be improved but also the production costs can be reduced to a minimum.

In the case of the production of film members each consisting of a plurality of layers, the molten resin jets extruded from a plurality of extruders 1 are fed into the single T die in such a way that the mixture of molten resins within the T die or after discharged from the discharge port 3 can be prevented and each layer is overlaid one upon the other, whereby the film members each consisting of a plurality of different resin layers can be produced.

More particularly, in the case of the production of film members each consisting of a plurality of different resin layers, a required number of extruders 1 are disposed at their respective suitable positions depending upon an object to be formed. Thereafter the extrusion port of each extruder 1 is communicated through an adapter with its corresponding molten resin jet input port of the T die so that a plurality of different molten resin jets are fed into the T die 2 through the molten resin feed passages defined within the adapters. As typically shown in FIGS. 4(a), (b) and (c), various types of T dies are used to form sheets each consisting of two layers. In each type, two inlet ports 4a and 4b of the T die are communicated through specially designed and constructed adapters 5a and 5b with two extruders (not shown). The molten resin jets fed to the inlet ports 4a and 4b flow through feed passage 6a and 6b, respectively, and after they are joined, they flow into a manifold 7 extended in the longitudinal direction of the T die 2 (in the direction perpendicular to FIG. 4) and then a feed passage with a small cross section 8. Thereafter they are discharged through the discharge port 3 whose cross section is defined by a stationary lip 9 and a movable lip 10 as a two-layer film member in which the thickness of each layer is uniform in the widthwise direction. In the case of the T die 2 shown in FIG. 4(b), the molten resin jets fed to the inlet ports 4a and 4b flow independent feed passages 6a and 6b and manifolds 7a and 7b in the order named and are united within a feed passage 8 and then are discharged through the discharge port 3 as a two-layer film. In the case of the T die as shown in FIG. 4(c), the molten resin jets fed to the inlet ports 4a and 4b flow through the independent feed passages 6a and 6b, manifolds 7a and 7b and feed passages 8a and 8b in the order named are discharged as a single layer film member through each of independent discharge ports 3. Thereafter the discharged single layer film members are combined into a two-layer film member.

In general, in the case of the production of plastic articles using the extruders 1 and the T die, in order to improve the efficiency of operation, at least one extruder 1 is used and disposed the position as shown in FIG. 1 or 2 so as to form cast films or sheets. Furthermore the position of the extruder 1 is changed as shown in FIG. 3 to produce laminates.

However, even though it is easy to switch the position of the T die 2 through 90° with respect to the extrusion machine 1, in the case of the projection of plastic articles each consisting of a plurality of layers, the positions of a plurality of molten resin jets inlet ports are considerably changed due to the switching of the relative position of the T die with respect to the extruder 1; that is, it is difficult to switch the positions of the inlet ports of the T die 2. In other words, in the case of the formation of plastic articles each consisting of a plurality of different resin layers, in order to switch the position of the T die 2, adapters adapted to communicate the discharge ports of the extruders with their corresponding inlet ports of the T die must be prepared and the operation for exchanging the adapters must be carried out. Especially in the case of the production of plastic articles each consisting of more than three layers, the inlet ports of the T die 2 and the adapters are increased in number. This causes a considerably troublesome problem.

In the case of winding a multi-layer film member around a take-up roll, in some cases it happens that the inward and outward resin layers must be reversed. In this case, in the conventional methods and apparatuses, the positions for communicating each extruder and the T die must be changed, which is very cumbersome.

Furthermore in the conventional production of multi-layer film members, they must be so formed that the thickness of each layer becomes uniform in the widthwise direction. And the film members each having a plurality of resin layers which are different in thickness are rejected as defective articles.

However, in the case of film members each having a plurality of different resin layers, except the fact that the thickness of each resin layer is made uniform in the widthwise direction, it was found out that they can be applied in various fields.

SUMMARY OF THE INVENTION

The present invention was made to overcome the above and other problems encountered in the conventional methods and apparatus and has for its object to provide a method and apparatus for feeding a plurality of different molten resin jets into a T die in which when a plurality of different molten resin jets extruded from a plurality of extruders are fed into a single T die, the molten resin jets are fed from their predetermined directions to unit them at a single position without causing the mixture of molten resins; and the relative position of the interface between the adjacent molten resin layers with respect to the longitudinal discharge port of the T die can be freely adjusted, whereby a plurality of different molten resin jets can be fed into the T die.

Another object of the present invention is to provide a method and apparatus for feeding a plurality of different molten resin jets into a T die, in which the switching of the relative positions of a plurality of extruders with respect to a single die can be carried out in an extremely simple manner; and the order of the layers of a multi-layer film member can be reversed also in a simple manner.

A further object of the present invention is to provide a method and apparatus for feeding a plurality of different resin jets into a T die which can form a film member in which the thickness of each resin layer varies in the widthwise direction.

To attain the above and other objects, a method for feeding a plurality of molten resin jet streams into a T die of the type in which a plurality of molten resin jet streams each of which is flowing from a predetermined direction, are united or combined in a single resin feed passage in communication with the T die without mixturing with each other and then the united or combined molten resin jet streams are fed into the T die, characterized in that the relative positional relationship between the interfaces of the adjacent molten resin jet streams in the resin feed passage on the one hand and an elongated discharge port of the T die is adjusted depending upon the structure of a film member to be produced.

An apparatus for feeding a plurality of molten resin jet streams into a T die in accordance with the present invention is characterized by comprising one resin feed passage in communication with the T die and a directional control valve for uniting or combining a plurality of molten resin jet streams each of which is flowing from a predetermined direction, without mixturing them with each other and changing the relative positions of the interfaces between the adjacent molten resin jet streams with respect to an elongated discharge port of the T die.

According to the method of feeding a plurality of molten resin jet streams into the T die in accordance with the present invention, a plurality of molten resin jet streams extruded from a plurality of extruders flow into one resin feed passage in communication with the T die always from predetermined directions, respectively. The molten resin jet streams fed into the resin feed passage are combined or united without mixturing with each other by a directional control valve. Furthermore the relative positional relationship between the interfaces between the adjacent molten resin jet streams resulting from the combination of the molten resin jet streams on the one hand and the elongated discharge port of the T die on the other hand is suitably adjusted depending upon the construction of a film member to be produced and then the combined or united molten resin jet streams are fed into the T-die.

In this manner, a plurality of molten resin jet streams fed into the T die is discharged as a film member having a desired construction.

The method and an apparatus for feeding a plurality of molten resin jet streams into a T die in accordance with the present invention are designed as described above, in the case of a plurality of molten resin jet streams extruded from a plurality of extruders being fed into one T die, they are fed from their predetermined directions, respectively, at one place and united or combined without mixturing with each other. The relative positional relationship between the intersurfaces of the adjacent molten metal jet streams combined on the one hand and the longitudinal direction of the discharge port of the T die can be freely adjusted and the combined or united molten resin jet streams can be fed into the T die. Furthermore, the relative positional relationship between a plurality of extruders and one T die can be switched in an extremely simple manner. Moreover the order of laminated layers can be reversed in a simple manner and it is possible to form a film member in which the thickness of each laminated layer can be varied in the widthwise direction. In addition, the apparatus is simple in construction yet very effective in operation and inexpensive to manufacture.

BRIEF DESCRIPTION OF THE DRAWINGS

FIGS. 5-12 illustrate a first preferred embodiment of an apparatus for feeding a plurality of different molten jets into a T die;

FIG. 5 is a longitudinal sectional view thereof;

FIGS. 6 and 7 are sectional views taken along the line VI—VI and the line VII—VII, respectively, of FIG. 5;

FIG. 8 is a perspective view, with a part cut away, of a first directional control valve;

FIG. 9 is a sectional view with a part cut away of a second directional control valve;

FIGS. 10 and 11 are a top view and a front view when the apparatus is used to form laminates;

DESCRIPTION OF THE PREFERRED EMBODIMENT

Figure 1:
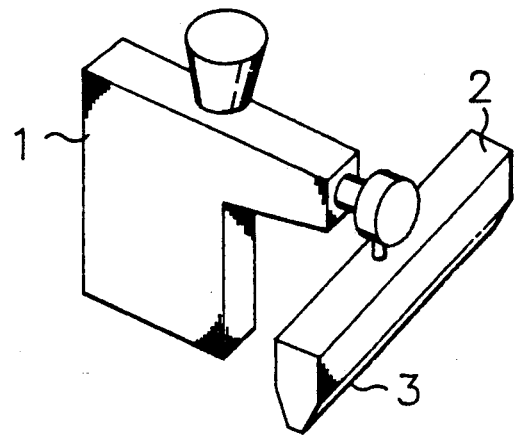
FIGS. 1-3 are perspective views illustrating the arrangements of an extrusion machine and a T die when a cast film, a sheet film and a laminate are formed.
Figure 2:
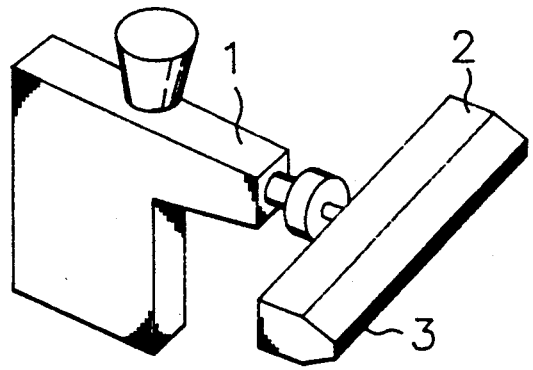
Figure 3:
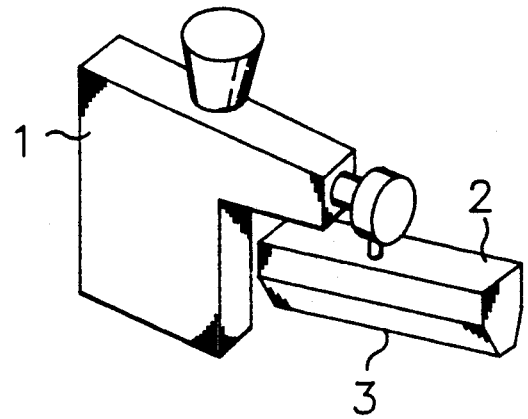
Figure 4A:
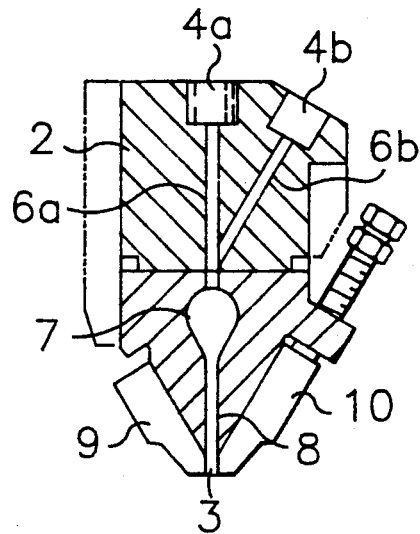
FIGS. 4(a), (b) and (c) are longitudinal sectional views of the conventional T dies, respectively, used to form a multi-layer film member.
Figure 4B:
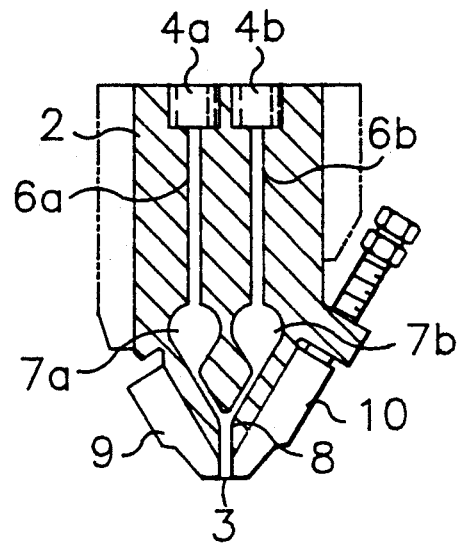
Figure 4C:
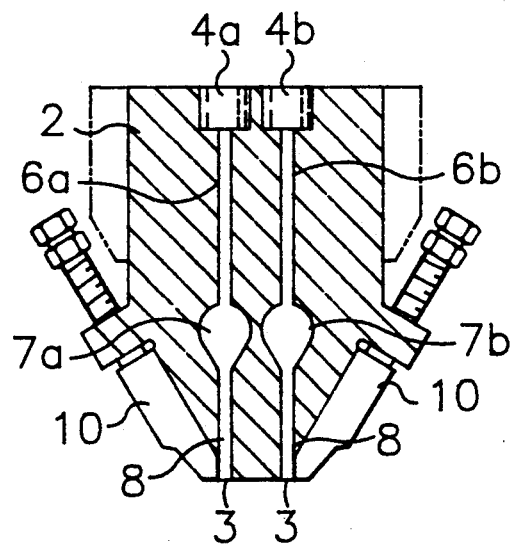

Referring now to FIGS. 5-21, the preferred embodiment of the present invention will be described.

FIGS. 5-12 illustrates a first preferred embodiment of the present invention and same reference numerals are used to designate similar parts used in the first preferred embodiment and the conventional apparatuses.

Figure 5:
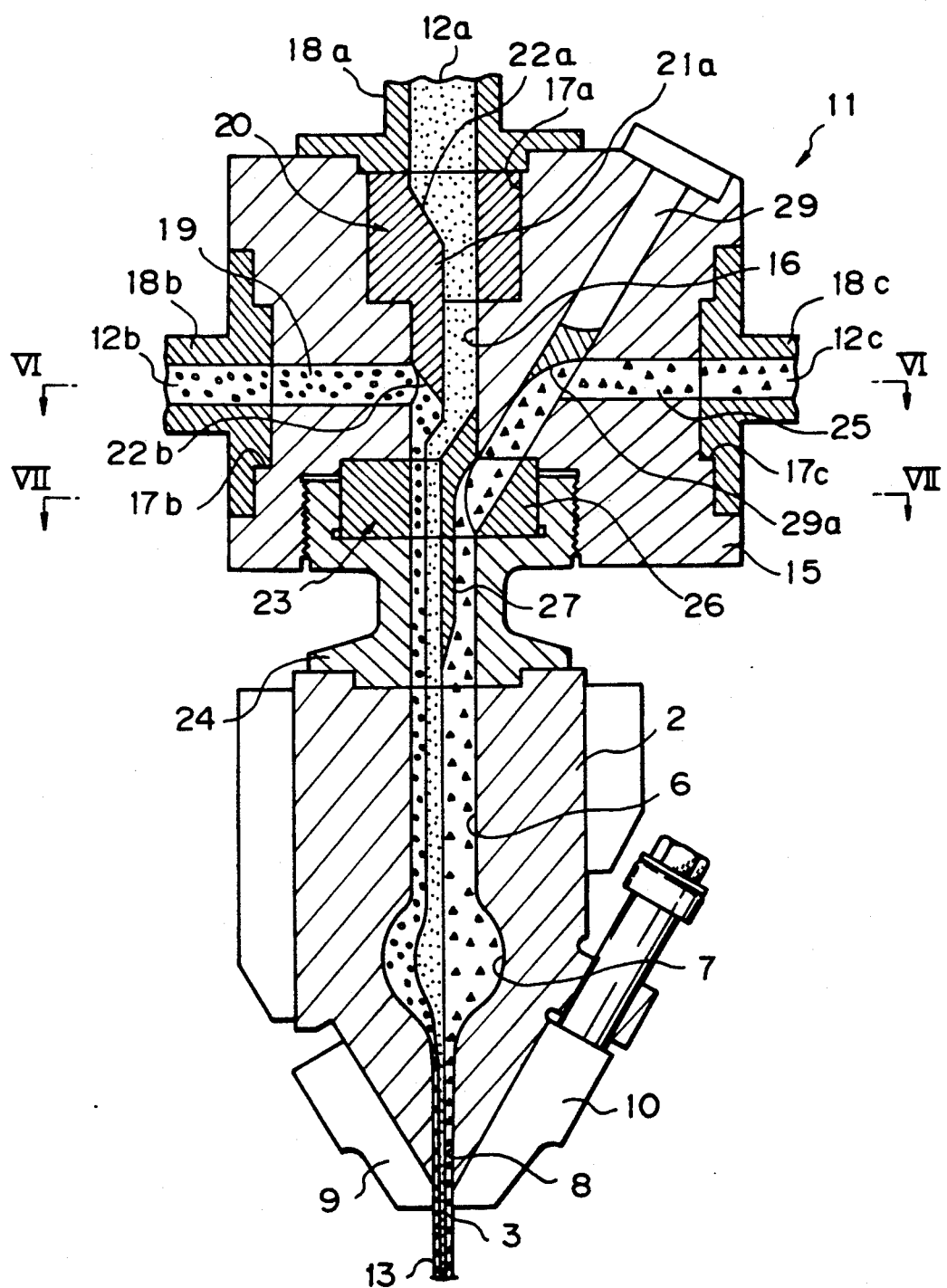
Figure 6:
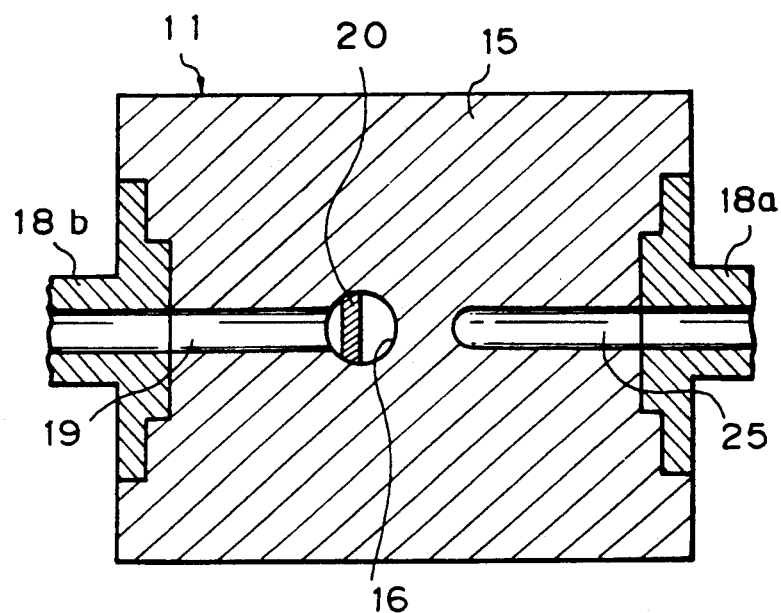
Figure 7:
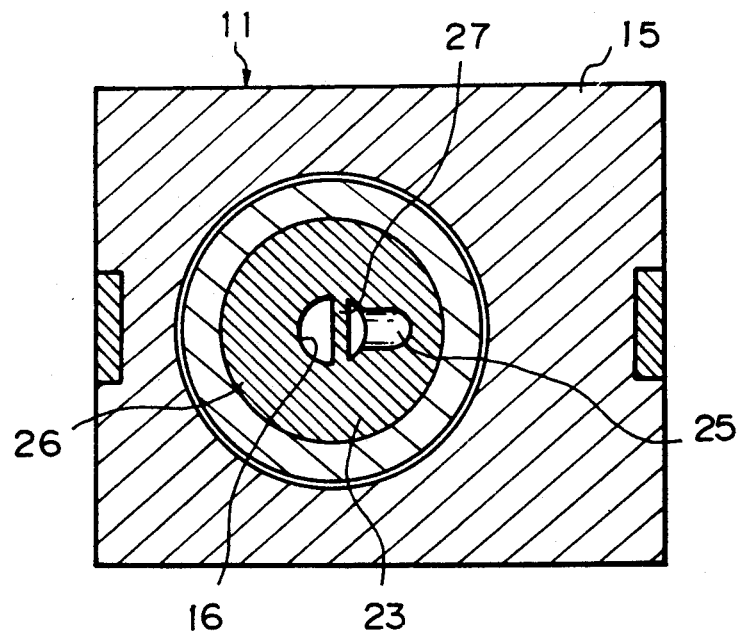
Figure 9:
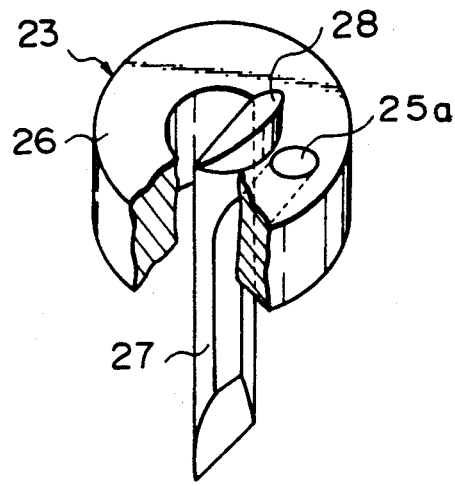
Figure 10:
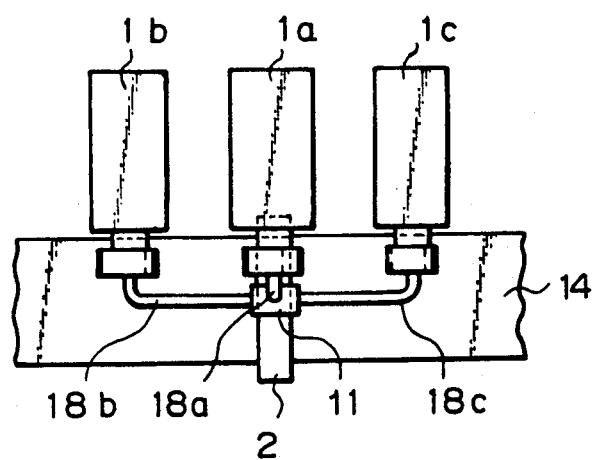

FIG. 5 illustrates a first preferred embodiment of a feed apparatus in accordance with the present invention which is used when three different molten jets 12a, 12b and 13c extruded three extruders 1a, 1b and 1c as shown in FIGS. 9 and 10 are laminated one upon the other to form a three-layer film member 13 which in turn is laminated over a film member 14 to be laminated.

Figure 8:
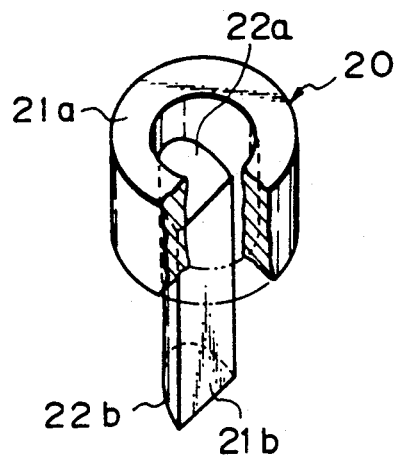

As best shown in FIG. 5, a resin feed passage 16 is vertically extended through a block-shaped main body 15 of the feed apparatus 11. An inlet port 17a at the upper end of the resin feed passage 16 is connected to an adapter 18a for feeding a molten resin jet extruded from the center extruder 1a. An inlet port 17b on the left side of the main body 15 is connected to an adapter 18b which feeds a molten resin jet extruded from the left extruder 1b and is communicated through a feed passage 19 with the vertical resin feed passage 16 so as to feed a molten resin 12b thereinto. Disposed at the lowest portion of the inlet port 17a of the resin feed passage 16 is a first directional control valve 20 so that the molten resins 12a and 12b are united without mixing with each other. As shown in FIG. 8, the first flow control valve 20 has a cylindrical portion 21a whose diameter is equal to that of the resin feed passage 16 and a semicircular portion defined within the cylindrical portion 21a so that the cross section area of the resin feed passage 16 is restricted almost one half of the cross sectional area of the resin feed passage 16. An inclined surface 22a for restricting the cross sectional area of the feed passage 16 is defined at the upper end of the semicircular portion 21b and an inclined surface 22b substantially in parallel with the upper inclined surface 22a is defined at the lower end of the semicircular portion 21b in order to facilitate the union of the molten resin jets 12a and 12b. A second directional control valve 23 is disposed downstream of the joint between the resin feed passage 16 and the communication passage 19 so that a molten resin jet extruded from the extruder 1c is united with the molten resin jets 12a and 12b which are already combined with each other without mixturing with them. The second directional control valve 23 is disposed coaxially of the resin feed passage 16 and is securely mounted in the main body through a connecting cylinder 24 which connected the feed apparatus 11 to a T die 2. An inlet port 17c on the right side of the main body 15 is connected to an adapter 18c for feeding a molten resin jet 12c extruded from the extruder 1c to the right of the extruder 1a. A communication passage 25 for feeding the molten resin 12c from the inlet portion 17c to the resin feed passage 16 is extended through the main body 15 and the second directional control valve 23. As best shown in FIG. 9, the second directional control valve 23 has a cylindrical portion 26 whose diameter is equal to that of the resin feed passage and a control tongue 27 defined with the cylindrical portion 26 so that the molten resin jet 12c is satisfactorily combined with the molten resin jets 12a and 12b which have been already united with each other. The control tongue 27 has an inclined upper end surface 28 which guides the molten resin jet 12a flowing downwardly from the first directional control valve 20 to approach the molten resin jet 12b. The portion of the control tongue 27 extended along the axial length of the cylinder portion 26 has a substantially semicircular cross section. The portion of the control tongue 27 extended downwardly beyond the lower end of the cylindrical portion 26 is in the form of a plate whose thickness is about ¼ of the diameter of the resin feed passage 16. The lower end of the control tongue 27 is converged so that the combination of the molten resin 12a and the molten flow 12c may be facilitated. A bend portion 25a of the communication passage 25 extended into the main body 15 is fitted with a rod-shaped pressure adjustment rod 29 having a bent surface 29 corresponding to the bent portion of the communication passage in such a way that the pressure adjustment rod 29 is freely movable in the axial direction. By adjusting the position of the bent surface 29a into the bent portion of the communication passage 25, it becomes possible to adjust the pressure of the molten resin jet 12c flowing through the communication passage 25.

Figure 11:
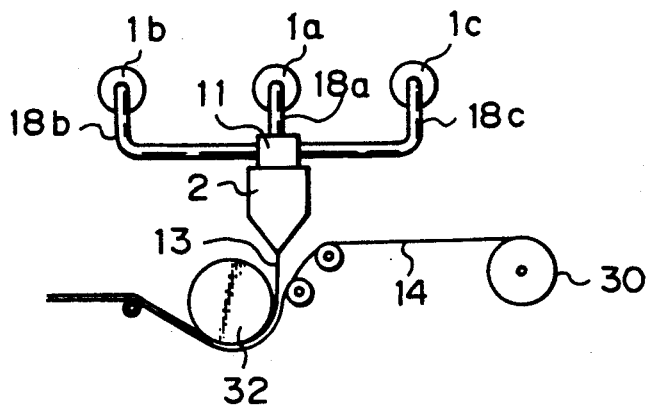

Next the mode of the operation of the first embodiment with the above mentioned construction will be described. As shown in FIGS. 10 and 11, first the three extruders 1a, 1b and 1c are energized so that molten resin jets fed therefrom through the adapters 18a, 18b and 18c to the inlet ports 17a, 17b and 17c, respectively. Of the molten resin jets 12a, 12b and 12c, the molten resin jets 12a and 12b fed into the feed passage 16 are united at the downstream portion of the cylindrical portion 21a of the first control directional valve 20 in such a way the interface between the molten resin jets (in the direction vertical to FIG. 5) becomes in parallel with the discharge port 3 of the T die (in the direction perpendicular to FIG. 5). Thereafter, at the downstream side of the second directional control valve 23, the molten resin jet or flow 12c is united with the molten resin jets 12a and 12b which have been already united with each or more particularly with the molten resin jet 12a in such a way that the interface between the molten resin jets 12a and 12c becomes in parallel with the longitudinal direction of the discharge port 3 of the T die 2. The three combined molten resin jets are fed to the single inlet port 4 of the T die. The molten resin jets 12a, 12b and 12c flow through the feed passage 6 without mixing with each other into the manifold 7 in which they are expanded in the longitudinal direction thereof. Thereafter they flow through the narrow feed passage 8 and then is discharged as a three-layer film member 13 through the discharge port 3 whose gap is controlled by lips 9 and 10. The three-layer film member is then laminated over a member to be laminated 14 (to be referred to as "a laminate substrate" hereinafter in this specification) unrolled from a supply roll 30. Thereafter they are cooled while passing over the cylindrical outer surface of a chilled roller 32 so that they are positively joined with the laminate substrate 14. Thereafter the laminate thus formed is transported to the succeeding laminating stage or a take-up roll (not shown).

Figures 12A, 12B:
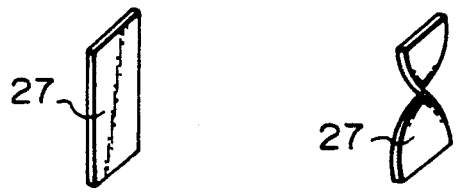
FIGS. 12(a) and (b) are perspective views illustrating the shapes of control tongue members, respectively, used in said second directional control valve.

FIG. 12(a) illustrates schematically the control tongue portion 27 downstream of the cylindrical portion 26 of the second control valve 23 in the first preferred embodiment. Furthermore, as shown in FIG. 12(b), as compared with the control tongue 27 shown in FIG. 12(a), when the control tongue 27 is twisted through 180° at the center between the ends about the axis of the resin feed passage 16 so that the film member 13 in which the order of lamination of the molten resin jets 12a, 12b and 12c is reversed may be laminated over the upper surface of the laminate substrate 14. When the control tongue 27 twisted through 180° is extended downward without changing its phase, the inwardly directed components of forces which tend to cause the molten resin jets twisted through 180° in the twisted directions may be damped so that the molten resin jets may be streamlined.

Figure 13:
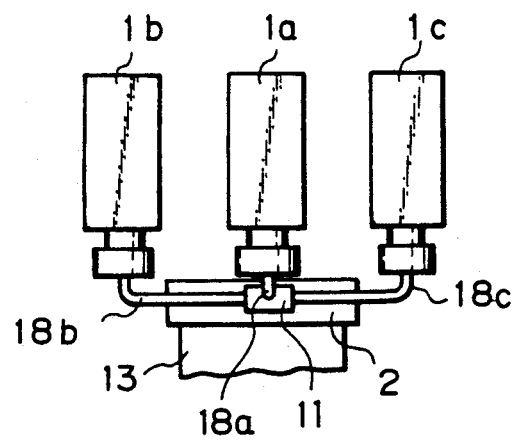
FIGS. 13 and 14 are a top view and a side view, respectively, when the feed apparatus is used to form a cast film.
Figure 14:
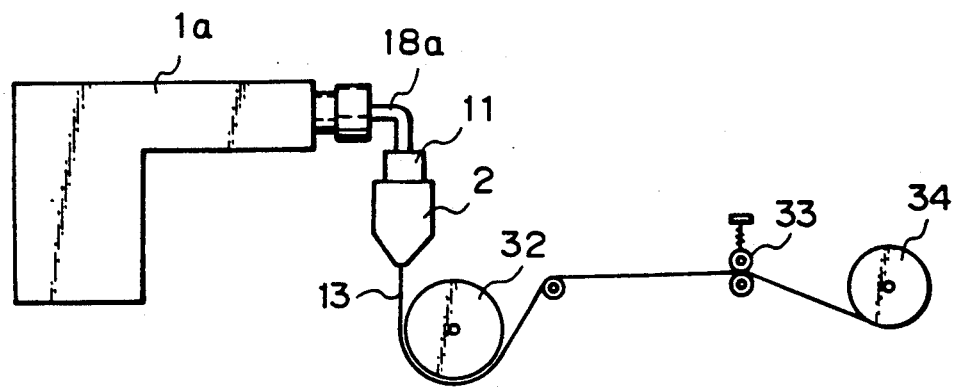
Figures 15A, 15B, 15C, 15D:
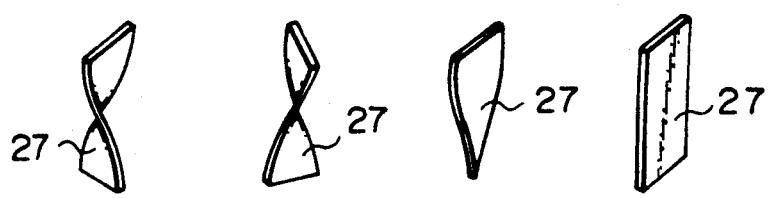
FIGS. 15(a), (b), (c) and (d) are perspective views illustrating the shapes of control tongue used in the second directional control valve.

When the extruders 1a, 1b and 1c and the T die 2, which are shown in FIGS. 13 and 14 and used to form a laminate in the manner just described above, are used in the formation of a cast film, as shown in FIG. 15(a), the lower portion of the control tongue 27 extended downwardly beyond the lower end of the cylindrical portion 26 of the second directional control valve 23 is twisted in the counterclockwise direction through about 90° about the axis of the resin feed passage 16. Then it becomes possible to feed the molten resin jets 12a, 12b and 12c into the T die after the intersurfaces between the molten resin jets 12a and 12b and between the molten resin jets 12b and 12c are rotated to become in parallel with the longitudinal direction of the discharge port 3 of the T die 2 and then to feed them into the T die. As a result, as shown in FIG. 16(a), the film member 13 in which the thickness of each molten resin jets 12a, 12b and 12c is uniform in the widthwise direction can be obtained.

The film member discharged through the discharge port 3 of the T die 2 is cooled by the chilled roll 32, then is taken up by a pinch roll 33 and is finely taken up by a take-up roll 34.

Figure 16A:
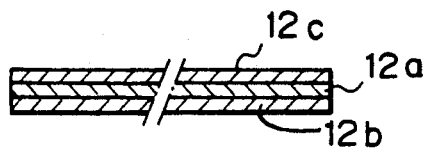
FIGS. 16(a), (b), (c) and (d) are sectional views of film members in the widthwise direction thereof which are formed by using the control tongues shown in FIGS. 15(a), (b), (c) and (d)
Figure 16C:
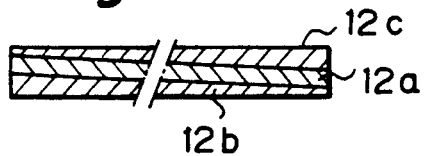
Figure 16B:
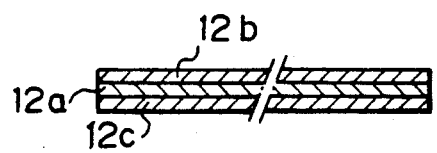

When the order of lamination of the molten resin jets 12a, 12b and 12c shown in FIG. 16(a) is reversed so that the succeeding processing step may be carried out satisfactorily or the inner and outer surface of the film member taken up by the take-up roll 34 may be determined in a desired manner, as shown in FIG. 15(b), the control tongue portion 27 extended downwardly beyond the lower end of the cylindrical portion 26 of the second directional control valve 23 is twisted through about 90° about the axis of the resin feed passage 16 in the clockwise direction. As a result, as shown in FIG. 16(b) a film member 13 in which the order of lamination of the molten resin jets or flows 12a, 12b and 12c is reversed is discharged.

As described above, according to the present invention, when the relative position of the T die 2 with respect to the previously disposed extruders 1a, 1b and 1c is changed to select one of various formation methods, it suffices to select a second directional control valve 23 having one of the control tongues as shown in FIG. 12(a) and (b) and FIGS. 15(a) and (b) adapted to define the construction of a desired film member 13. As a result, unlike the conventional methods and apparatus, it is not needed to select and change the adapters 5a and 5b depending upon a desired formation method. Furthermore, despite of forming a multi-layer film member 13, the T die to be used may have the single-extrusion type construction as shown in FIG. 5 so that the T die 2 can be made extremely simple in construction and at inexpensive costs.

So far it has been described that the thickness of a plurality of molten resin layers are uniform in the widthwise direction of the film member and next a film member 13 whose molten resin layers 12a, 12b and 12c are varied in thickness in the widthwise direction of the film member 13 will be described.

In the case of the production of a cast film by the apparatus shown in FIGS. 13 and 14, when the control tongue 27 of the second directional control valve 23 is twisted through about 15° about the resin feed passage 16 as shown in FIG. 15(c), the molten resin jets 12a, 12b and 12c are fed into the T die 2 in such a way that the interfaces of the molten resin jets are inclined with respect to the longitudinal direction of the discharge port 3 of the T die 2. As a result, as shown in FIG. 16(c), the thickness of the outer layers 12a, 12b and 12c are gradually varied in the widthwise direction of the film member 13. In the case of the film member as shown in FIG. 16(c), when the outer layers 12b and 12c have different colors, when one views the film member 13, he/she will notice that the color of the film member 13 varies gradually in the widthwise direction. Furthermore, one of the molten resin layers 12b and 12c is a resin having a high degree of thermal adhesive force and is used for thermal welding of a thicker portion. Then thermal welding with a considerably higher degree of reliability can be obtained.

Figure 16D:
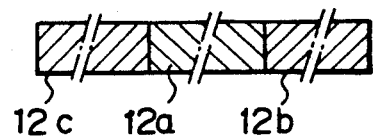

In the case of the production of a cast film, when a flat control tongue 27 is used in the second directional control valve 23 as shown in FIG. 15(d), the intersurface between the molten resin streams 12a, 12b and 12c which are fed into the T die become perpendicular to the longitudinal direction of the discharge port 3 of the T die 2, as shown in FIG. 16(d) the film member 13 consists of the molten resin streams 12a, 12b and 12c each arranged as one layer in the widthwise direction. In this case, while the film member 13 is transported through the chilled roller 32 and a pair of pinch rollers 33 to the take-up roll 34, each molten resin streams are cut off and separated from each other by cutters (not shown) and each cut-off resin layer may be taken up by a different take-up roll 34. Therefore three kinds of single-layer film members 13 whose thickness is determined at a high degree of accuracy can be obtained.

The film members as shown in FIG. 16(c) and (d) are formed by suitably adjusting the twist of the tongues in the second directional control valve 23 as shown in FIG. 15(c) and (d).

Next the film member 13 in which the thickness of each molten resin layer is varied in the widthwise direction of the film member 13 by incorporating a resin stream changing member 35 in the second directional control valve 23 will be described.

Figure 17:
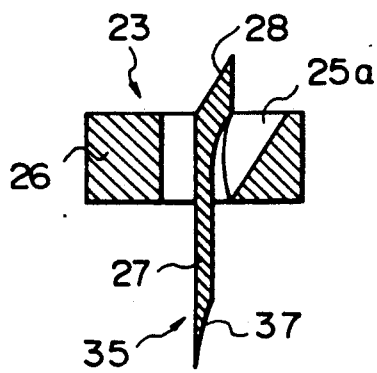
FIGS. 17 and 18 illustrate different molten resin jet flow switching means, respectively.
Figure 18:
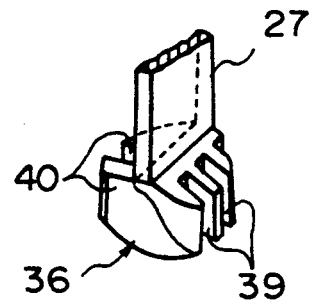

As shown in FIG. 17, the resin stream changing member 35 is formed by integrally connecting to the lower end of the control tongue 27 of the second directional control valve 23 or by integrally forming a conical member 36 at the lower end of the control tongue 27 as shown in FIG. 18.

Figures 19A, 19B, 19C, 19D:
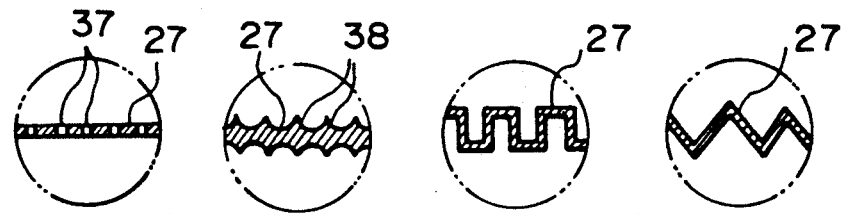
FIGS. 19(a), (b), (c), (d), (e), (f), (g) and (h) are perspective views illustrating different embodiments of molten resin jet switching means.

In FIGS. 17 and 19(a), the resin stream changing member 35 is in the form of a plurality of small holes 37 extended through the control tongue 27 in the direction of thickness thereof. For the sake of better understanding of the resin stream changing member 35, it is assumed that the molten resin streams 12a and 12c are flowing at both sides, respectively, of the control tongue 27. Then the molten resin stream at a higher pressure flows through the small holes 37 into the molten resin stream at a lower pressure. As a result, as shown in section in FIG. 20(a), the molten resin stream 12c is instructed in some portions into the molten resin stream 12a so that the contact between the molten resin streams 12a and 12c becomes three dimensional. As a result, the surface of contact is increased in area so that the joint strength between them can be increased.

Figure 20A:
FIGS. 20(a), (b), (c), (d), (e), (f), (g) and (h) are longitudinal sectional views in the widthwise direction of film members formed by the molten resin jet flow switching means shown in FIGS. 19(a), (b), (c), (d), (e), (f), (g) and (h)
Figure 20B:

The control tongues as shown in FIG. 19(a) have some convex portions so that as shown in FIG. 20(b), the joint force between the molten resin layers 12a and 12c is increased.

Figure 20C:
Figure 20D:
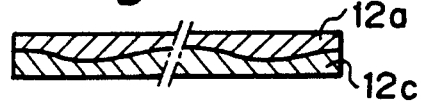
Figure 20E:

The control tongues as shown in FIGS. 19(c), (d) and (e) have a zig-zag cross section so that as shown in FIGS. 20(c), (d) and (e), the joint force between the molten resin layers 12a and 12c is increased.

Figures 19E, 19F, 19G, 19H:
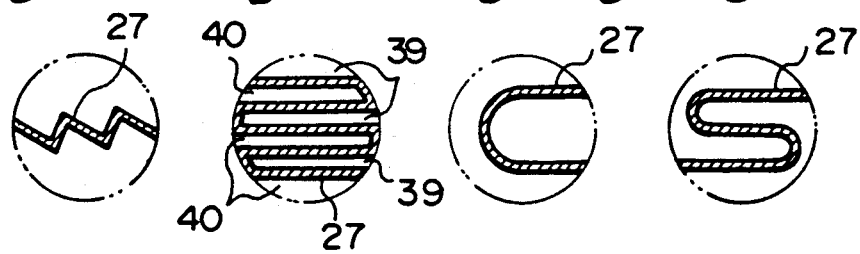
Figure 20F:
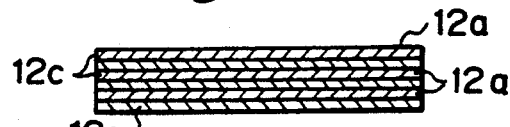

In FIG. 18 and 19(f), the conical member 36 is formed with three passages 39 for introducing the molten resin stream 12a into the T die 2 and three passages 40 for introducing the molten resin stream 12c into the T die 2. In this case, the first and second mentioned passages 39 and 40 are defined alternately so that as shown in FIG. 20(f), a film member 13 in which three layers of the molten resin streams 12a and three layers of the molten resin streams 12c are alternately laminated can be obtained.

Figure 20G:
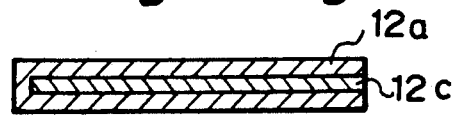
Figure 20H:
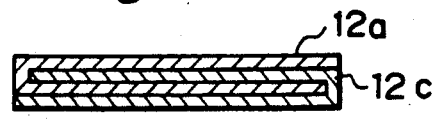

Like the molten resin stream changing member shown in FIG. 18 and 19(f), the molten resin stream changing members shown in FIGS. 19(g) and (h) are also in the form of a cone 36 so that the film members 13 in which the molten resin streams 12a and 12c are laminated as shown in FIGS. 20(g) and (h) are obtained.

Figures 21A, 21B, 21C:
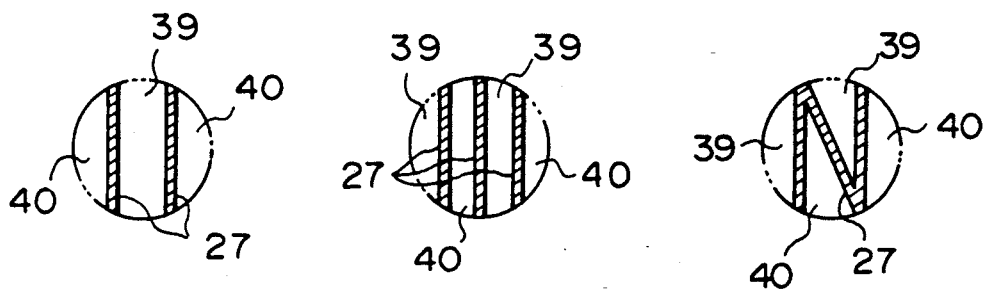
FIGS. 21(a), (b), (c), (d), (e) and (f) are cross sectional views of other embodiments, respectively, of molten resin jet flow switching means.
Figures 21D, 21E, 21F:
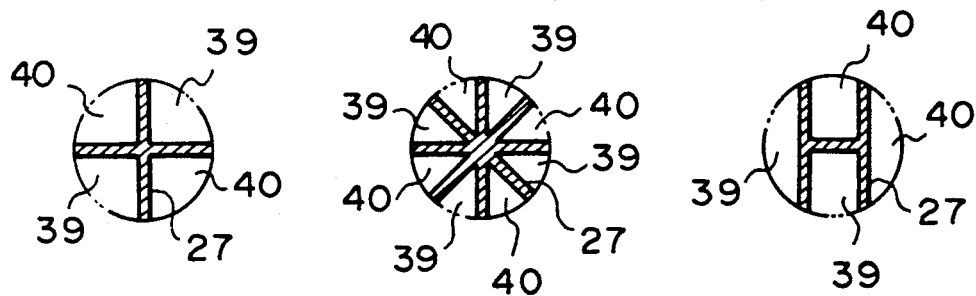

Furthermore, as shown in FIGS. 21(a), (b), (c), (d), (e) and (f), the arrangements of the passages 39 and 40 for flowing the molten resin streams 12a and 12c, respectively, are varied in the lowermost portion of the cone 36 so that the thickness of each of the molten resin jet streams 12a and 12c may be varied according to the desin of a desired molten resin film 13.

Moreover, in order to vary the thickness of each of the molten resin jet streams 12a and 12c in the direction of thickness of the film member 13, the adjustment of a degree of twist of the control tongue 27 used in the second directional control valve 23 and the adjustment of the directions of the molten resin jet streams by the molten resin stream changing member 35 are suitably combined so that a further excellent film member 13 can be obtained by the synergistic effect of the control tongue 27 and the molten resin jet stream changing member 35.

So far it has been described that two kinds of molten resin jet streams are used in the above embodiments, but it is to be understood that the present invention may be equally applied to use more than three molten resin jet streams 12a, 12b and 12c.

As described above, according to the present invention, it becomes very simple to obtain a high quality film member 13 in which the thickness of each of a plurality of molten resin jet streams 12a, 12b and 12c is varied in the widthwise direction of the film member 13.

When it is desired to feed more than four kinds of molten resin jet streams into the T die, a corresponding number of directional control valves may be used.

It is to be understood that the present invention is not limited to the above-described embodiments and that various modifications can be effected if necessary without departing from the true spirit of the present invention.

What is claimed is:

1. A method for combining a plurality of at least three molten resin streams in an axially elongated tubular passageway into a single united resin stream without mixing said streams of said plurality to produce, upon extrusion, a laminated multilayer film of variably selectably ordered lamina with each layer of said film made of one of said resin streams, comprising:

a. combining two of said streams without mixing after successively laterally displacing said uncombined unmixed streams within and respecting said passageway to provide a first combined stream having unmixed component streams, with stream interfaces therebetween angularly oriented according to a selected configuration of said lamina to be produced on said film;

b. thereafter uniting the combined stream with an additional one of said plurality of streams after angularly orienting and laterally displacing said combined and said additional streams within said passageway respecting one another to provide a second angularly oriented combined stream for input to an extruder for producing said laminated multilayer film having the variably selected order of said lamina.

2. Apparatus for combining a plurality of molten resin streams into a single stream without mixing together to produce, upon extrusion, a laminated multilayer web or film with each layer made of resin from one of said streams, comprising:

a. a body, having an axial passageway therethrough, individually receiving said streams;

b. a first axially rotatable valve member within said body for selectably permitting the flow of a second resin stream and for combining and angularly orienting two of said streams, including said second stream, into a first combined stream having unmixed stream components with interfaces therebetween angularly oriented according to a selected configuration of said lamina on said film, with at least one of said streams flowing through said first rotatable valve member, comprising;

i. a rotatable collar, through which at least one of said streams flows; and ii. a member fixed to, rotatable unitarily therewith and axially projecting from said collar into said passageway into which said first stream flows through said collar and in which said two streams combine into said first combined stream, comprising:

(1) an angular surface portion rotatable unitarily with said valve member for controlling the combining of said two streams to provide said first combined stream having unmixed components angularly oriented according to a selected configuration of said lamina as they are combined into said first combined stream;

c. a second axially rotatable valve member within said body for selectably permitting flow of another resin stream and for combining and angularly orienting said first combined stream and said another stream of said plurality of streams into a second combined stream having unmixed components angularly oriented according to said selected configuration of said lamina on said film, said first combined stream and said additional stream flowing separately through at least part of said second rotatable valve member within said body and downstream of said first rotatable valve member, comprising:

i. a collar through which said first combined stream and said additional stream flow at least part way therethrough separated from each other; and ii. a member fixedly connected to, rotatable unitarily with and axially projecting from said collar into said passageway, including (1) an angular surface portion movable unitarily with said second valve member for controlling the combining of said two streams to provide said second united stream having unmixed components angularly oriented according to said selected configuration of said lamina as they are combined into said second combined stream.

3. A method for combining a plurality of molten resin streams into a single stream prior to extrusion to produce a multilayer film having respective layers defined by said streams, comprising:

a. laterally displacing a first one of said streams flowing in an axially elongated passageway into a transverse cross-sectional area of said passageway of substantially about half the transverse cross-sectional area of said passageway prior to displacement of said first stream by contacting said first stream with a surface inclined at a first angle respecting said passageway axis;

b. laterally displacing a second one of said streams flowing into said passageway into transverse cross-sectional area of said passageway downstream of said position of lateral displacement of said first stream and being of substantially about half the transverse cross-sectional area of said passageway prior to displacement of said first stream by contacting said second stream with a surface inclined at said first angle respecting said passageway axis;

c. combining said two laterally displaced streams in said passageway downstream of said position of lateral displacement of said second stream to provide a single stream having unmixed components with interfaces therebetween oriented according to a selected configuration of said layers in said film.

4. A method for combining a plurality of molten resin streams into a single stream prior to extrusion to produce a multilayer film having respective layers defined by said streams, comprising:

a. laterally displacing a first stream flowing in an axially elongated passageway into a transverse cross-sectional area of said passageway of substantially about half the transverse cross-sectional area of said passageway prior to displacement by contacting said first stream with a surface inclined respecting said passageway axis;

b. laterally displacing succeeding ones of said streams flowing into said passageway, at positions downstream of where said first stream is laterally displaced, into transverse cross-sectional area of said passageway unoccupied by said stream resulting from previous lateral displacement(s) and being of substantially about half the transverse cross-sectional area of said passageway occupied by said stream resulting from said prior lateral displacement(s) by contacting said succeeding streams with surfaces inclined respecting said passageway axis;

c. successively combining said laterally displaced streams in said passageway downstream of said position of lateral displacement of said succeeding streams to provide a single stream having unmixed components with interfaces therebetween oriented according to a selected configuration of said layers in said film.

5. Apparatus for combining a plurality of molten resin streams into a single stream without mixing prior to extrusion to produce a multilayer film with layers defined by resins of said respective streams, comprising:

a. a body having an axially elongated passageway therewithin;

b. a first flow control valve axially rotatably disposed within said passageway, having an axial bore forming a portion of said passageway, including:

i. means substantially positioned within said passageway portion defined by said axial bore and axially rotatable unitarily with said control valve for laterally displacing a first resin stream flowing through said passageway and said valve;

ii. means for selectably permitting flow of a second resin stream into said passageway;

iii. means for laterally displacing said second resin stream joining said passageway downstream of said valve in a direction opposite that of displacement of said first resin stream flowing through said passageway;

c. a second flow control valve axially rotatably disposed within said passageway, having an axial bore therewithin forming a portion of said passageway, having an axially offset second bore connecting exterior of said second valve with said passageway for feeding a third molten resin stream into position for combining with a combined resin stream flowing through said passageway, including:

i. means substantially positioned within said passageway and axially rotatable unitarily with said second flow control valve for laterally displacing said combined resin stream flowing through said passageway and said valve at a position upstream of a position at which said combined resin stream flowing through said passageway and said third resin stream flowing through said axially offset second bore are combined.

6. Apparatus of claim 5 wherein said control valves comprise:

a. generally cylindrical collars having central cylindrical bores substantially coaxial with and defining portions of said axial passageway; and with said axially offset second bore of said second valve being skew to said axis and connecting an annular surface of said collar with said cylindrical bore.

7. Apparatus of claim 6 wherein said displacing means comprise:
  a. axially elongated tongues connected to said collars, rotatable unitarily therewith and extending axially therefrom into said passageway downstream of said collars.

8. Apparatus of claim 7 wherein said tongues comprise:
  a. upstream facing resin flow displacement surfaces which are angularly inclined to said axial passageway and have projected area in the axial direction of substantially half the transverse cross-sectional area of said axial passageway.

9. Apparatus of claim 8 wherein said surfaces of said tongues are inclined at a common angle.

10. Apparatus of claim 7 wherein said tongues include upstream facing resin flow displacing surfaces angularly inclined to said axial passageway and have projected area in the axial direction of substantially half the transverse cross-sectional area of said axial passageway.

11. Apparatus of claim 10 wherein said surfaces of said tongues are inclined at a common angle.

12. Apparatus for combining a plurality of at least three molten resin streams into a single stream without mixing prior to extrusion to produce a multilayer film with layers defined by resins of said respective streams, comprising:
  a. a body having an axially elongated passageway therewith;
  b. first flow control valve means axially rotatably disposed within said body, comprising:
    i. a generally cylindrical collar having a substantially axial bore therewithin forming a portion of said passageway;
    ii. means, substantially positioned within said passageway portion defined by said bore, extending radially inwardly from and fixedly connected to said collar, for laterally displacing a first resin stream flowing axially through said passageway and said collar of said first valve means, comprising:
      (1) a substantially planar resin displacement surface facing axially upstream in said passageway and being inclined to the passageway axis at a preselected angle;
    iii. tongue means, fixedly connected to and extending from said resin stream lateral displacement means substantially axially away from said collar, for laterally displacing a second resin stream of said plurality joining said passageway downstream of said first flow control valve means in a lateral direction opposite that of said resin stream flowing through said collar of said first flow control valve means, comprising:
      (1) a substantially planar resin displacement surface facing axially downstream in said passageway and being inclined to the passageway axis at said preselected angle;
  c. at least one second flow control valve means axially rotatably disposed within said body, comprising:
    i. a generally cylindrical collar having a substantially axial bore therethrough forming a portion of said passageway downstream of said first flow control valve means and having a second bore therethrough connecting an exterior surface of said collar contacting said body to said passageway defined by said axial bore through said collar;
    ii. means fixedly connected to said collar, substantially positioned within said passageway portion defined by said bore for laterally displacing a united resin stream, defined by individual resin streams combined upstream of said second flow control valve, flowing axially through said passageway and through said bore of said collar of said second flow control valve means, comprising:
      (1) a substantially planar resin displacement surface facing axially upstream in said passageway and being inclined to the passageway axis at an angle;
    iii. tongue means, fixedly extending downstream from said resin stream lateral displacement means substantially axially from said collar, for maintaining separation of an additional resin stream of said plurality from said united resin stream in said passageway after joining said united resin stream in said passageway by passage through said second bore for a distance sufficiently downstream of said collar that individual streams of said united resin stream in said passageway are sufficiently united that substantially no mixing thereof occurs when said additional resin stream joins therewith.

13. Apparatus of claim 12 wherein said resin stream displacing means of said second flow control valve laterally displaces said united resin stream flowing axially through said passageway in the direction said tongue means of said first flow control valve displaces said second resin stream.

14. Apparatus of claim 12 further comprising means for adjusting pressure of said resin stream flowing through said second bore of said second flow control valve.

15. Apparatus of claim 14 wherein said pressure adjusting means further comprises rod means selectably insertable into said second bore to regulate size of a throat portion of said second bore.

16. Apparatus of claim 15 wherein said pressure adjusting means is within said body.

17. Apparatus of claim 12 wherein said tongue means of said second flow control valve is plate-shaped having thickness of about one-fourth the diameter of said resin feed passageway at a position substantially aligned with a downstream facing surface of said cylindrical collar of said second flow control valve and tapers to a knife edge at the extremity of said tongue means remote from said cylindrical collar.

18. Apparatus of claim 17 wherein said knife edge is substantially perpendicular to the axial direction.

19. Apparatus of claim 12 wherein said tongue means of said second control valve is plate shaped, axially elongated and twisted substantially 180 degrees about the axis of elongation between said resin displacement means and the extremity of said tongue means remote from said cylindrical collar.

20. Apparatus of claim 12 wherein said tongue means of said second control valve is plate shaped, axially elongated and twisted substantially 90 degrees about the axis of elongation between said resin displacement means and the extremity of said tongue means remote from said cylindrical collar.

21. Apparatus of claim 12 wherein said tongue means of said second control valve is plate shaped, axially elongated and twisted substantially less than 90 degrees about the axis of elongation between said resin displacement means and the extremity of said tongue means remote from said cylindrical collar.

22. Apparatus of claim 12 wherein said tongue means of said second control valve is substantially plate-shaped at juncture with said resin displacement means, is axially elongated and is conically-shaped at the extremity of said tongue means remote from said cylindrical collar.

23. Apparatus of claim 12 wherein said tongue means of said second control valve is substantially plate-shaped at juncture with said resin displacement means, is axially elongated, tapers to a knife edge at the extremity of said tongue means remote from said cylindrical collar and is perforate in the transverse direction proximate to said knife edge.

24. Apparatus of claim 12 wherein said tongue means of said second control valve is substantially plate-shaped at juncture with said resin displacement means, is axially elongated, tapers to a knife edge at the extremity of said tongue means remote from said cylindrical collar and is of zig-zag axial cross-section proximate said knife edge.

25. Apparatus of claim 24 wherein said zig-zag is defined by equal length legs.

26. Apparatus of claim 25 wherein said zig-zag is formed of 90 degree angles.

27. Apparatus of claim 26 wherein legs of said zig-zag are of two different lengths.

28. Apparatus of claim 22 wherein said conical extremity of said tongue means is axially slotted.

29. Apparatus of claim 28 wherein alternate ones of said slots communicate with one another and with respective laterally facing surfaces of said plate-shaped portion of said tongue means.

30. Apparatus of claim 22 wherein said conical extremity of said tongue means includes a sinuous axial slot communicating with one laterally facing surface of said plate-shaped portion of said tongue means.

31. The method of claim 4 further comprising:
 a. adjusting orientation of interfaces of adjacent resin streams relative to a longitudinally elongated discharge port through which said combined streams are extruded to produce a desired configuration in said multilayer film by twisting said streams to a desired orientation through contacting said streams with a twisted plate-like member within said passageway prior to successively combining said laterally displaced streams and thereafter extruding the same.

32. The method of claim 4 further comprising:
 a. contacting said laterally displaced streams with respective surfaces of a perforate member for resin communication between said streams on respective sides of said member via orifices therethrough prior to combining said streams.

33. The method of claim 4 further comprising:
 a. contacting said laterally displaced streams with a curved surface having passageways, for flow of resin from said respective contacting streams therethrough, connecting portions of said curved surface contacted by respective ones of said streams with a region of said passageway downstream of said curved surface at which said streams are combined.

* * * * *